United States Patent
Sugiyama (10) Patent No.: US 8,531,378 B2
(45) Date of Patent: Sep. 10, 2013

(54) MONOCHROMATIC LIQUID CRYSTAL DISPLAY

(75) Inventor: Takashi Sugiyama, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 1115 days.

(21) Appl. No.: 12/488,633

(22) Filed: Jun. 22, 2009

(65) Prior Publication Data

US 2009/0322668 A1    Dec. 31, 2009

(30) Foreign Application Priority Data

Jun. 25, 2008  (JP) ................................ 2008-165862

(51) Int. Cl.
*G09G 3/36*  (2006.01)

(52) U.S. Cl.
USPC ........................................................ 345/101

(58) Field of Classification Search
None
See application file for complete search history.

(56) References Cited

U.S. PATENT DOCUMENTS

2008/0079878 A1* 4/2008 Sugiyama et al. ............ 349/119

FOREIGN PATENT DOCUMENTS

| EP | 0740181 A1 | * | 10/1996 |
| JP | 4-118624 A | | 4/1992 |
| JP | 4118624 A | * | 4/1992 |
| JP | 2001-215930 A | | 8/2001 |
| JP | 2001215930 A | * | 8/2001 |
| JP | 2004-62021 A | | 2/2004 |
| JP | 2004062021 A | * | 2/2004 |

OTHER PUBLICATIONS

Japanese Office Action dated Aug. 28, 2012 (and Partial English translation thereof) in counterpart Japanese Application No. 2008-165862.

* cited by examiner

*Primary Examiner* — Alexander S Beck
*Assistant Examiner* — Kirk Hermann
(74) *Attorney, Agent, or Firm* — Holtz, Holtz, Goodman & Chick, PC (57) ABSTRACT

A liquid crystal display comprises a back light emitting monochromatic light, a liquid crystal display element comprising, a pair of opposing substrates, a nematic liquid crystal layer placed between the pair of opposing substrates, an electrode pattern formed on a nematic liquid crystal layer side of each substrate, a pair of polarizers placed outside the pair of substrates, and a controller which controls light emission of the back light and a voltage applied to the liquid crystal display element, wherein the controller restrain change in retardation of the liquid crystal display element by lowering non-selection voltage applied to the liquid crystal display element when environmental temperature increases and increasing non-selection voltage applied to the liquid crystal display element when environmental temperature decreases.

10 Claims, 10 Drawing Sheets

MONOCHROMATIC LIQUID CRYSTAL DISPLAY

CROSS REFERENCE TO RELATED APPLICATION

This application is based on Japanese Patent Application 2008-165862, filed on Jun. 25, 2008, the entire contents of which are incorporated herein by reference.

BACKGROUND OF THE INVENTION

A) Field of the Invention

This invention relates to a liquid crystal display.

B) Description of the Related Art

When no voltage is applied, a direction of a long axis of nematic liquid crystal is oriented in a plane parallel to a substrate surface with which a liquid crystal layer is contacted. The direction of a long axis of nematic liquid crystal can be oriented in parallel to a rubbing direction by forming an orientation film on the substrate surface and thereon forming an orientation structure by a rubbing process. Incident light can be considered by classifying into a polarization component along with a long axis of the liquid crystal molecules and a polarization component along with a short axis perpendicular to the long axis.

An optical rotating structure wherein the liquid crystal molecules twist at a particular angle in a thickness direction can be realized by using a pair of opposing substrate with different orientations. When irradiating linearly polarized light along with the orientation of the liquid crystal molecules at a light incident surface of the liquid crystal layer, a polarization direction of the incident light can be rotated along with the twist of the liquid crystal molecules and output linearly polarized light rotated at the twist angle. When a threshold voltage or a voltage above a threshold value (ON-voltage) is applied between the opposing substrates, a long axis of liquid crystal molecule stands up and the optical rotation power will be lost. Depending on the existence of the optical rotation power, ON/OFF state of display can be controlled. The optical rotation power can be selectively controlled by forming electrodes in selected shapes on the opposing substrates and controlling voltages between the electrodes. The existence of the optical rotation power can be detected by a pair of polarizers, a polarizer and an analyzer. A nematic liquid crystal display with the twist angle of 90 degrees is called a twisted nematic (TN) liquid crystal display.

A polarizer having a polarization axis parallel to orientation is placed at a light incident side of a liquid crystal layer with a twist angle of 90 degrees, and an analyzer having a polarization axis parallel or perpendicular to a polarization direction rotating at 90 degrees is placed at a light output side of the liquid crystal layer. If a polarizer having a polarization direction parallel to a polarization direction of passing light is placed at the light output side of the liquid crystal layer (arranged in a crossed Nicols state), it will be a normally white display. If a polarizer having a polarization direction perpendicular to a polarization direction of passing light is placed at the light output side of the liquid crystal layer (arranged in a parallel Nicols state), it will be a normally black display. A nematic liquid crystal display with a twist angle over 90 degrees is also possible. A nematic liquid crystal display with a twist angle over 90 degrees is called a super twisted nematic (STN) liquid crystal display.

In a simple matrix driving method, for example, common electrodes arranged in parallel to each another in an x-direction and segment electrodes arranged in parallel to each another in an y-direction are opposed to each another to display a pixel at selected x and y addresses. The common electrodes are scanned, and image signals corresponding to a display image are applied to the segment electrodes. The image signals not less than the threshold value (ON-voltage) are applied to the selected pixels. A non-selection voltage less than the threshold value is applied to unselected pixels. No voltage is applied to a background region where no opposing electrode exists. The non-selection voltage is set to within a range which can maintain a state of orientation of the liquid crystal molecules similar to a state when no voltage is applied. In the simple matrix driving method, it is necessary to increase number of pixels to improve resolution. It is necessary to increase number of scanning lines (increase a duty ratio), and it is desired for pixels to response fast and with high precision toward application of a threshold voltage or a voltage over a threshold value. A TN type liquid crystal display has a limit on a response speed, and so it is not suitable for a high-duty ratio operation. An STN type liquid crystal display is more suitable for a high-duty ratio operation.

Generally a STN type liquid crystal display shows a transmission spectrum having a maximum value at a certain wavelength and a minimum value at a certain wavelength when no voltage is applied. The transmission spectrum when the selection voltage is applied is assumed to be basically the same as the transmission spectrum when no voltage is applied. There is a type of a STN type liquid crystal display, so-called blue mode display, which turns blue when no voltage is applied and turns white when the ON-voltage is applied. In this specification, when the expression "the voltage is applied" is used without special explanation, it refers to that the ON-voltage is applied.

For example, a polarization axis at the light incident side is arranged by rotating 15 to 45 degrees clockwise from an orientation at the light output side, and a polarization axis at the light output side is arranged by rotating 25 to 55 degrees clockwise from an orientation at the light output side. When no voltage is applied, for example, light in the red region near 620 nm wavelength is cut off and transmission light is viewed as blue. Contrast is low because light leaks even if it is cut off.

Japanese Laid-Open Patent No. 2004-62021 discloses a structure for improving a light blocking property at the time of cutting off state by having dichroic dye in liquid crystal formation of a blue mode STN type liquid crystal display. As other means for improving a light blocking property, an optical compensator can be used.

Normally in the blue mode, a white back light is used as a back light; however, a monochromatic light source such as a light emitting diode (LED) may be used. In this case, by decreasing a transmission rate and improving a light blocking property when no voltage or non-selection voltage is applied at light emitting wavelengths of the back light in order to increasing the transmission rate and improving a light transmitting property when the ON voltage is applied, a high contrast normally black display whose display color is a color of the back light can be obtained.

In case of a mode wherein monochromatic is displayed by the normally black display, it is required to improve contrast between a state when no voltage or non-selection voltage is applied and a state when the ON-voltage is applied. Moreover, in case of a liquid crystal display mounted on a car, improvement in viewing angle properties and thermal properties are desired.

SUMMARY OF THE INVENTION

It is an object of the present invention to provide a nematic liquid crystal display of which contrast, viewing angle properties and thermal properties are improved on a normally black mode.

According to one aspect of the present invention, there is provided a liquid crystal display, comprising: a back light emitting monochromatic light; a liquid crystal display element comprising, a pair of opposing substrates, a nematic liquid crystal layer placed between the pair of opposing substrates, an electrode pattern formed on a nematic liquid crystal layer side of each substrate, a pair of polarizers placed outside the pair of substrates; and a controller which controls light emission of the back light and a voltage applied to the liquid crystal display element, wherein the controller restrain change in retardation of the liquid crystal display element by lowering non-selection voltage applied to the liquid crystal display element when environmental temperature increases and increasing non-selection voltage applied to the liquid crystal display element when environmental temperature decreases.

According to the present invention, a display with high contrast, good viewing angle properties and thermal properties can be obtained on a normally black mode of a nematic liquid crystal display.

DETAILED DESCRIPTION OF THE PREFERRED EMBODIMENTS

Figure 1A:
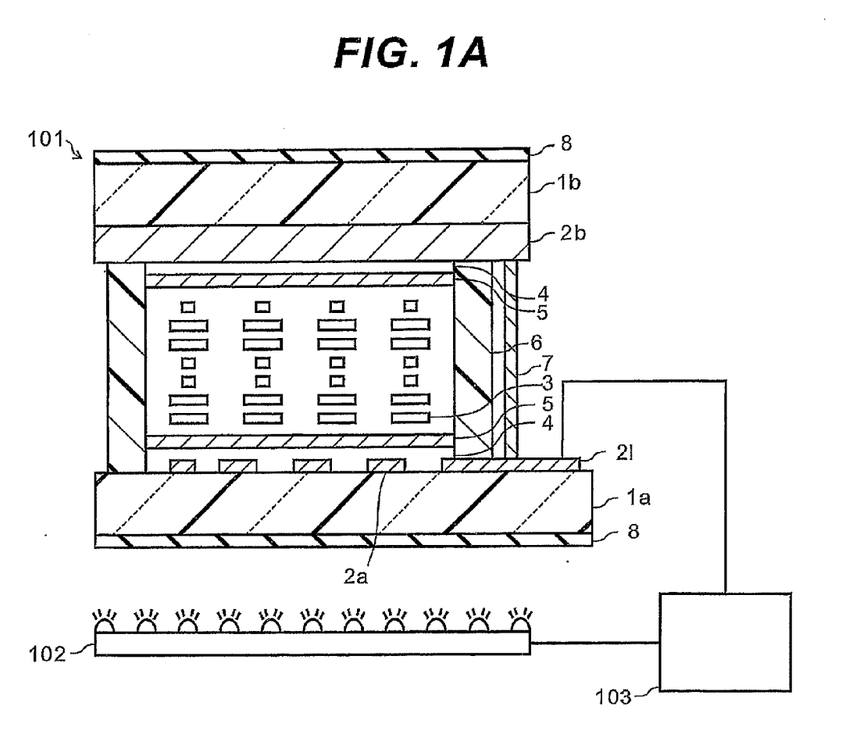
FIG. 1A and FIG. 1B are schematic cross sectional views of a STN liquid crystal display and TN liquid crystal display.

FIG. 1A is a schematic cross sectional view of a STN liquid crystal display. The liquid crystal display has a liquid crystal display element 101, a back light 102 and a controller 103 as main components. The liquid crystal display element 101 passes or blocks light from the back light 102 to display a display pattern defined by patterns of electrodes 2a and 2b. The controller 103 controls a voltage applied to the liquid crystal display element 101 and light emission of the back light 102.

The liquid crystal display element 101 is explained. An indium tin oxide (ITO) film, which is a transparent film, is formed on each one of two glass substrates 1a and 1b by a CVD, vapor deposition or sputtering process, and the formed films are patterned to form desired ITO electrode patterns 2a and 2b and an output wiring 21 by a photolithography process. Insulating films 4 that cover the ITO electrode patterns 2a and 2b are formed on the glass substrates by flexo printing. The insulating films 4 are not indispensable but are preferably formed to prevent short-circuiting between the upper and lower substrates. Instead of forming the insulating films on both substrates, an insulating film may be formed on one of two substrates. The insulating films can be formed by a vapor deposition, sputtering or the likes with a metal mask other than the flexo printing. Orientation films 5 are formed on both insulating films 4 with almost same patterns as the insulating films 4 by flexo printing, etc.

For example, a rubbing process is performed on the orientation films 5. The rubbing process is a process in which the orientation films 5 are rubbed by a cylinder rolled with cloth rolling rapidly. The liquid crystal molecules contacting with the orientation films are orientated in accordance with the orientation process. The nematic liquid crystal molecules contacting with the horizontal orientation films are orientated in the rubbing direction and stand up the liquid crystal molecule edge in the rubbing end direction from the substrate at a predetermined angle (pre-tilt angle).

A seal 6 with a predetermined pattern to define a plane shape of the liquid crystal layer is screen-printed. The seal 6 may be formed by using a dispenser instead of the screen-printing. As a seal material, for example, thermal hardening ES-7500, which can be obtained from Mitsui chemicals, Inc. may be used. An optical hardening or optical-thermal hardening type sealing material may also be used. Several percentages of glass fibers having a diameter of 6 µm are included in the sealing material 6 as gap controllers. As an interconnect 7 electrically connecting the electrodes on one substrate with the wiring on another substrate, for example, material made of the sealing material ES-7500 including several percent of 6.5 µm Au balls is screen-printed to a predetermined position as the interconnect 7 at an outer region of the seal 6. The seal pattern 6 and the interconnect pattern 7 are formed only on the substrate 1b, and gap control material is dispersed by a dry dispersion process on the substrate 1a. The gap control material can be made of 6 μm plastic balls.

The two substrates 1a and 1b are placed on each other facing their orientation films 5 at a predetermined position to form a cell, and the seal 6 is harden by a thermal process in a state of being pressed. The glass substrates are scribed by a scriber and divided into vacant cells in a predetermined size and a shape by breaking. The liquid crystals 3 containing chiral agent are filled to the vacant cell by vacuum injection method, and then a filling point are sealed by an end-seal. The glass substrate is chamfered and washed to form a liquid crystal cell. The liquid crystal cell will be an STN-type in which the long axis direction of the liquid crystal molecules rotates around a thickness direction of the liquid crystal layer at angles larger than 90 degrees by setting of the chiral material of the liquid crystal 3 and rubbing direction.

Figure 1B:
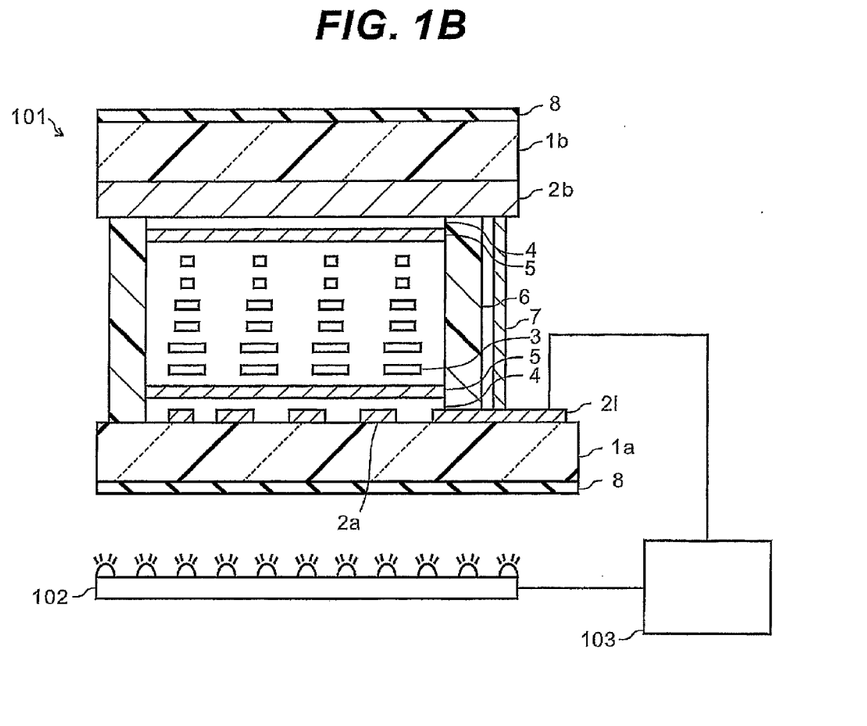

As shown in FIG. 1B, the liquid crystal cell may be a TN-type of which liquid crystals 3 have a 90-degree twist angle by adjusting the chiral material of the liquid crystal 3 and a rubbing direction. In case of the TN-type, the chiral material is not necessary. The STN liquid crystal display and the TN liquid crystal display are the same except the twist angles.

As shown in both FIG. 1A and FIG. 1B, the polarizers 8 are adhered at upper and lower surfaces of the liquid crystal cells, and the liquid crystal display elements 101 are formed. Each of the liquid crystal display elements 101 in FIG. 1A and FIG. 1B is combined with a back light 102 and connected with a controller 103.

Figure 2A:
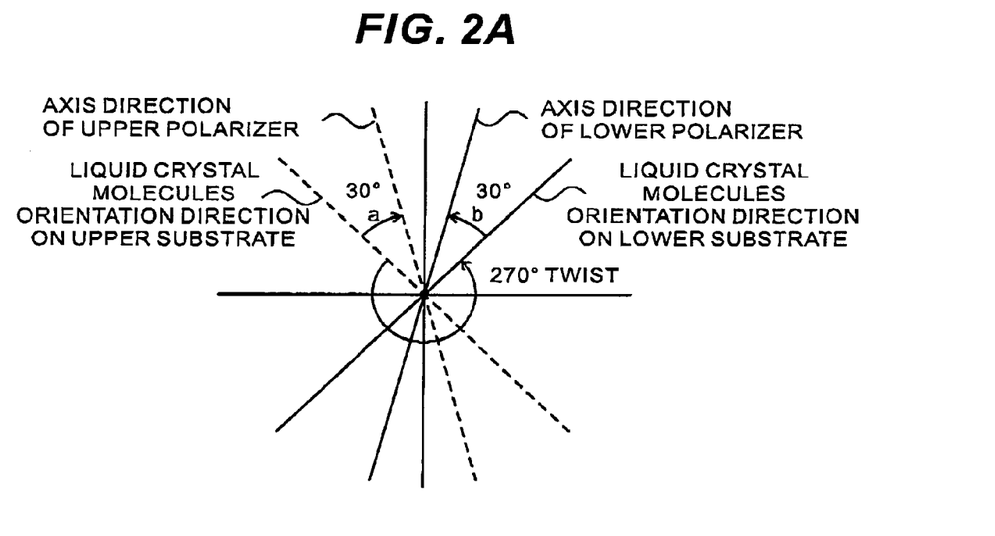
FIG. 2A is a diagram showing in-plane directions of an example of a blue mode STN liquid crystal display.

With reference to FIG. 2A, an example of a blue-mode STN liquid crystal display is explained. FIG. 2A is a diagram showing in-plane directions the blue mode STN liquid crystal display. As shown in the diagram, the twist angle of the liquid crystal layer is 270 degrees. The polarization axes are positioned in outer region of the twist angle. The smaller angle (angle a) is 30 degrees in angles between the orientation direction of the liquid crystal molecules adjacent to (placed at the nearest position from) the upper substrate (front substrate) and the axis direction of the upper polarizer, and the smaller angle (angle b) is also 30 degrees in angles between the orientation direction of the liquid crystal molecules adjacent to the lower substrate (back substrate) and the axis direction of the lower polarizer.

Figure 2B:
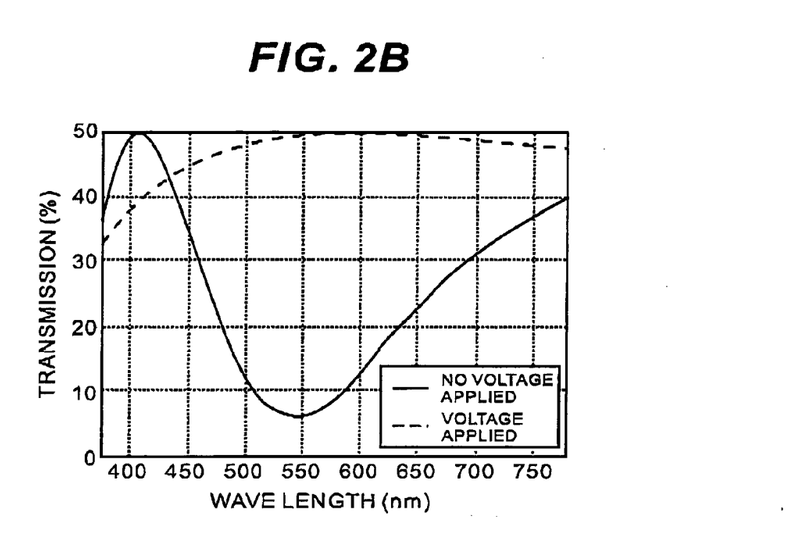
FIG. 2B shows transmission spectra at a wavelength region including a visible region of the blue mode STN liquid crystal display shown in FIG. 2A when no voltage is applied and when the (ON) voltage is applied.

FIG. 2B shows transmission spectra at a wavelength region including a visible region of the blue mode STN liquid crystal display shown in FIG. 2A. The transmission spectra explained in this specification were calculated by self-produced simulation software. As shown in the diagram, the transmission spectrum (represented by a solid line) of the STN liquid crystal display when no voltage is applied has the maximum value and the minimum value of transmission rates. The maximum value of a transmission rate is within a blue wavelength region and is approximately 50%. The minimum value of a transmission rate is at around a 540 nm wavelength and is approximately 6%. In this type of the liquid crystal display, a region to which ON voltage is not applied, non-selected pixels and a background are blue. A broken line represents transmission spectrum when the (ON) voltage is applied. A transmission rate in the blue region is slightly lower than that in the other visible regions; however, the transmission rate is approximately 50% over the whole visible region, and a region to which ON voltage not applied is white because light from a white back light is transmitted.

As a back light of the liquid crystal display, for example, a light emitting device producing monochromatic light such as light-emitting diode (LED) may be used. The inventor examined to perform monochromatic display on the normally black mode by matching a peak emission wavelength of the backlight with a wavelength at which the minimum transmission rate when no voltage is applied.

First of all, the inventor examined whether or not monochromatic display on the normally black mode was possible by using the above-described blue-mode STN liquid crystal display element. The transmission spectrum of the liquid crystal display element is approximately 6% when no voltage is applied at a wavelength of 540 nm and the transmission spectrum of the liquid crystal display element is approximately 48% when the voltage is applied at a wavelength of 540 nm. When a monochromatic STN liquid crystal display is made by using this liquid crystal display element and a back light of a light emitting wavelength region near 540 nm, the normally black mode cannot be realized because at least approximately 6% of light are come off and it turns to be monochromatic shading display. The maximum contrast will be approximately only 8. Therefore, it is desired for improving the light blocking effect and contrast by approximating the minimum value of the transmission rate when no voltage is applied to 0%.

As a result of examining various positions of the polarizers, the inventor found positions of the polarizers with a wavelength at which the transmission rate became approximately 0% in transmission spectrum when no voltage is applied. An angle (smaller angle) between the orientation direction of the liquid crystal element adjacent to the upper substrate and the axis direction of the upper polarizer is defined as an angle a, and an angle (smaller angle) between the orientation direction of the liquid crystal element adjacent to the lower substrate and the axis direction of the lower polarizer is defined as an angle b. The angle a and the angle b are indicated by absolute values, and they have positive values regardless of a direction. It was found that the minimum value of the transmission rate could be made to be approximately 0% when no voltage was applied by setting sum of the angle a and the angle b (a+b) to a predetermined angle. In case of using a red light-emitting diode with a light-emitting peak wavelength of 630 nm is examined.

Figure 3:
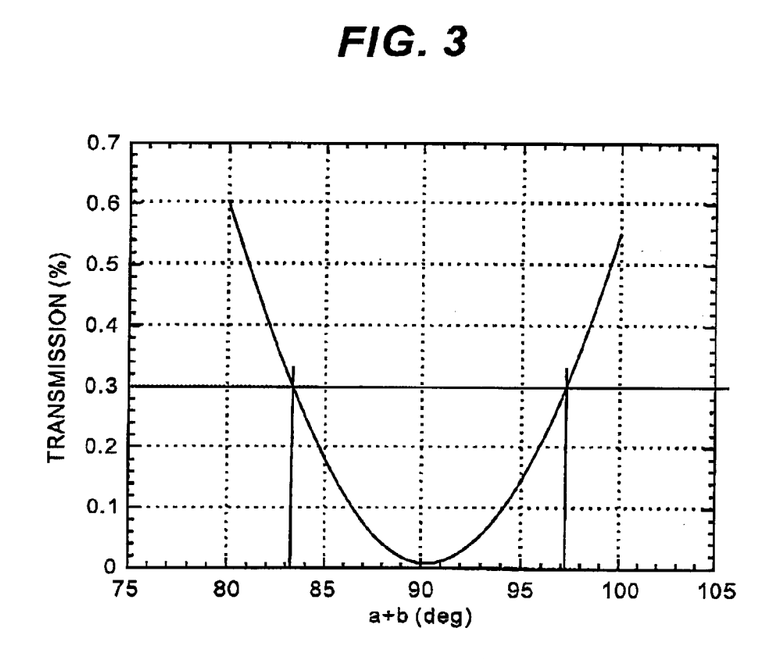
FIG. 3 is a graph showing a relationship between a transmission rate of a liquid crystal display element at wavelength of 630 nm when no voltage is applied and angles a+b.

FIG. 3 is a graph showing a relationship between the transmission rate of a liquid crystal display element at a wavelength of 630 nm when no voltage is applied and the angles a+b. The minimum value of the transmission rate is adjusted to appear at wavelength of 630 nm. When the angle a+b is 90 degrees, the minimum value of the transmission rate becomes approximately 0%, and the transmission rate increases as the angle a+b is getting further from 90 degrees. After various samples having different angles between the axis of the polarizers and the orientation direction were made and examined, it was found that a sample having the minimum value of the transmission rate of 0.3% or less when no voltage is applied was suitable for the liquid crystal display element. As shown in FIG. 3, in a position that the angle a+b is 90 degrees ±7 degrees, the minimum value of the transmission rate becomes 0.3% or less (condition 1).

A wavelength at which a transmission rate becomes 0% or not more than 0.3%, a transmission rate which can realize the normally black mode, can be matched with a light emitting wavelength of a back light by adjusting retardation of a liquid crystal cell. The retardation of a liquid crystal cell is a product of birefringence Δn of liquid crystals in a cell multiplied by a cell thickness d. The retardation of a liquid crystal cell can be adjusted by changing a cell thickness d or by changing birefringence Δn, which is a difference between a refractive index in a long axis direction of liquid crystals and a refractive index in a short axis direction of liquid crystals. Moreover, the retardation of a liquid crystal cell can be adjusted by selection of liquid crystal material or by mixing liquid crystal materials having different properties. Furthermore, the retardation of a liquid crystal cell depends on temperature. In this specification, the retardation represents retardation at temperature of 20 degrees Celsius.

Figure 4:
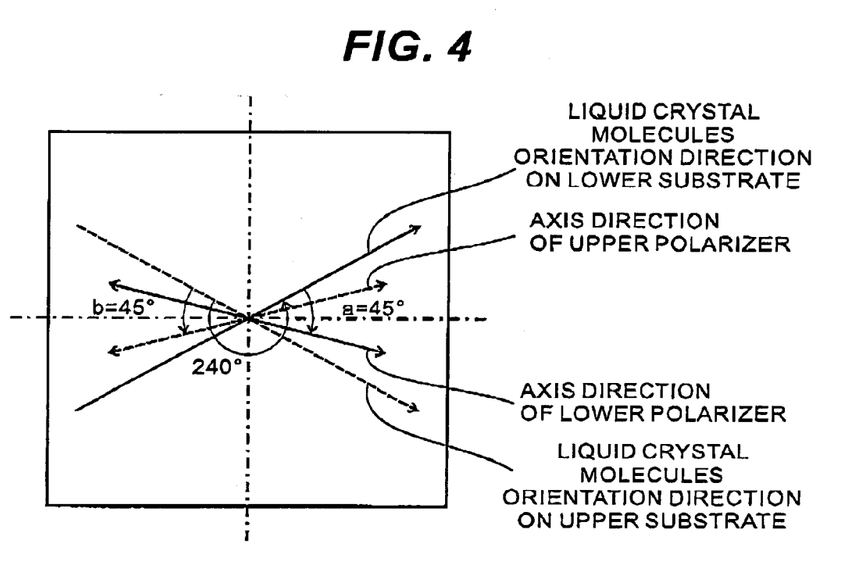
FIG. 4 is a diagram showing in-plane directions of substrate rubbing directions and axis angles of polarization filters according to another example of a liquid crystal display element.

FIG. 4 is a diagram showing an example of substrate rubbing directions and axis angles of polarizers according to an example of the liquid crystal display element satisfying the condition 1. The twist angle of the liquid crystal layer is 240 degrees. The axis directions of the polarizers are positioned within the twist angle of the liquid crystal layer. The angle a between the rubbing direction of the upper substrate and the axis direction of the upper polarizer is 45 degrees, and the angle b between the rubbing direction of the lower substrate and the axis direction of the lower polarizer is 45 degrees.

Figure 5:
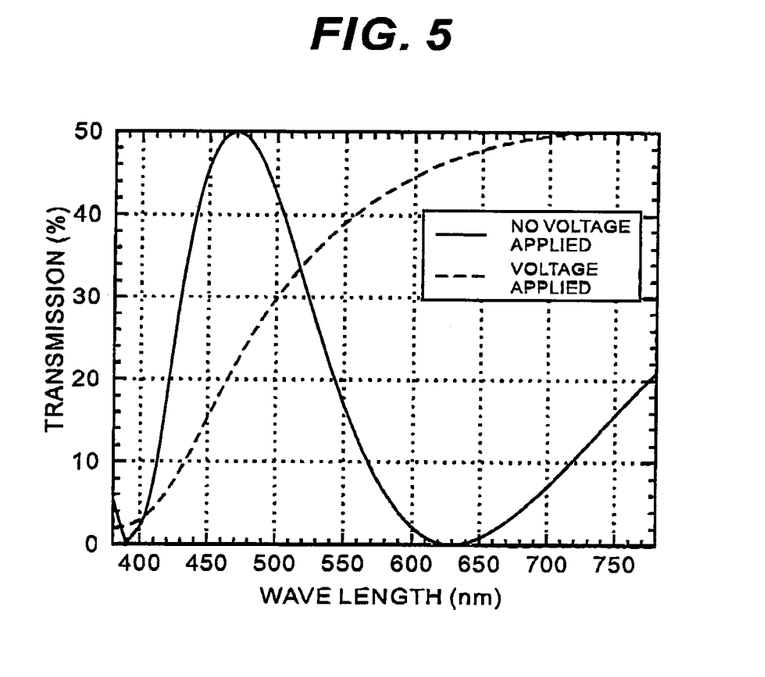
FIG. 5 shows transmission spectra at a wavelength region including a visible region of the STN liquid crystal display element shown in FIG. 4 when no voltage is applied and when the (ON) voltage is applied.

FIG. 5 shows transmission spectra at a wavelength region including a visible region of the STN liquid crystal display element shown in FIG. 4. Temperature is 25 degrees Celsius, and retardation of the liquid crystal cell is 952 nm. In the diagram, a solid line represents the transmission spectrum when no voltage is applied, and a broken line represents the transmission spectrum when the voltage is applied. In the liquid crystal display element with the angle a+b of 90 degrees, the liquid crystal cell retardation of 952 nm and the twist angle of 240 degrees at 25 degrees Celsius, the transmission spectrum has the minimum value of approximately 0% at a wavelength of 630 nm when no voltage is applied. When this liquid crystal display element and a red back light of a wavelength 630 nm are combined, the normally black mode can be realized because the light of the back light can be blocked when no voltage is applied. When the (ON) voltage is applied, red light display with high contrast can be realized because the transmission rate at the wavelength of 630 nm is approximately 47%.

The examination of the transmission spectrum when no voltage is applied is continued. The wavelength wherein the transmission rate becomes the minimum value when no voltage is applied shifts to the long wavelength side by increasing the retardation of the liquid crystal cell, and shifts to the short wavelength side by decreasing the retardation.

Figure 6:
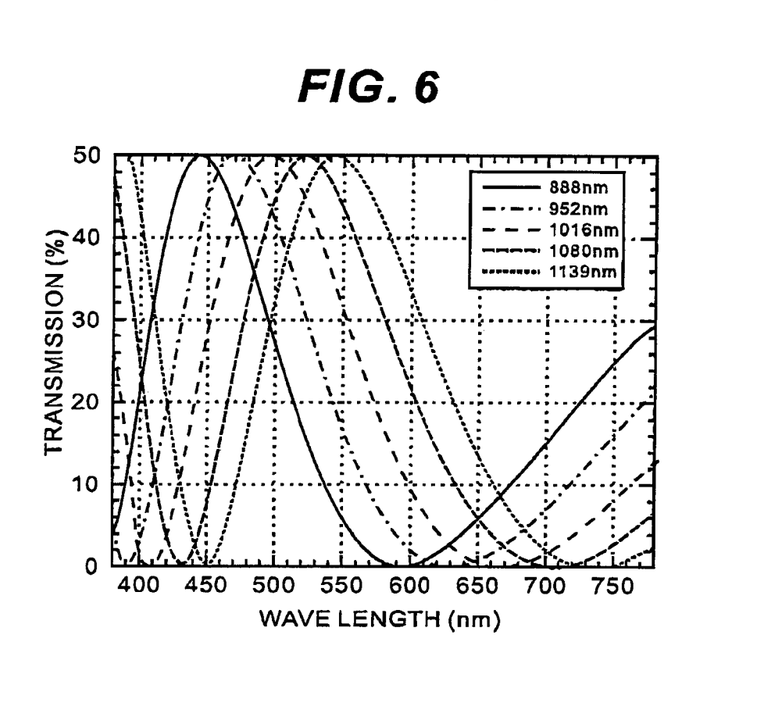
FIG. 6 shows transmission spectra at a wavelength region including a visible region of the STN liquid crystal display element when retardation is changed to 888 nm, 952 nm, 1016 nm, 1080 nm and 1139 nm as a parameter.

FIG. 6 shows the shifts of the transmission spectra when no voltage is applied and retardation is changed to 888 nm, 952 nm, 1016 nm, 1080 nm and 1139 nm. As shown in the diagram, when the retardation of the liquid crystal cell becomes large, whole of the transmission spectrum shifts to the right (long wavelength side), and it is found that the wavelength of the minimum value of the transmission rate is shifted to the long wavelength. In another respect, light of one wavelength, for example, a wavelength of 630 nm, is almost absolutely blocked when the retardation is 952 nm; however, the transmission rate rises and light leakage is occurred when the retardation decreases to 888 nm or increases to 1016 nm or more. High contrast display becomes difficult regardless of the changes in the retardation.

Birefringence of a general liquid crystal becomes larger when the temperature lowers. Therefore, the retardation $\Delta nd$ of the liquid crystal cell becomes larger when the temperature lowers. When the retardation becomes larger, the transmission spectrum and the wavelength at which the transmission rate is the minimum value shift to the long wavelength side. When the retardation changes by change in the temperature, the transmission spectrum changes and the transmission rate of the wavelength at which the transmission rate is the minimum value increases.

The retardation of the liquid crystal cell changes by change in environmental temperature, and thereby the contrast and the display quality degraded. The inventor examined countermeasure of a phenomenon that the transmission spectrum shifts to the short wavelength side or the long wavelength side by change in the retardation caused by change in temperature. The temperature and applied voltage are observed as parameters to change the retardation.

A usable temperature range defined by the maximum temperature and the minimum temperature is assumed. At the maximum temperature, a wavelength of the minimum value of the transmission rate is matched to a wavelength of a monochromatic back light. In this example, red display is assumed and so the light emitting wavelength is set to 630 nm. The maximum temperature is selected from a temperature range of 10 to 40 degrees Celsius lower than the phase transition temperature at which the liquid crystal phase-changes to be an isotropic phase.

STN liquid crystal made by Merck Ltd. is used as the liquid crystal to be filled into the liquid crystal cell. The birefringence at the normal temperature is 0.15, and phase transition temperature $T_{NI}$ of the nematic liquid crystal phase to the isotropic phase is 100 degrees Celsius. Temperature of 80 degrees Celsius is set as the highest temperature which is 20 degrees Celsius lower than the transition temperature. The light emitting wavelength of the monochromatic back light is set at 630 nm.

The cell thickness was adjusted so that the wavelength of the minimum value of the transmission rate becomes 630 nm at 80 degrees Celsius. It was found that the cell thickness for the wavelength of the minimum value of the transmission rate at 80 degrees Celsius to become 630 nm was 7.2 μm.

Figure 7:
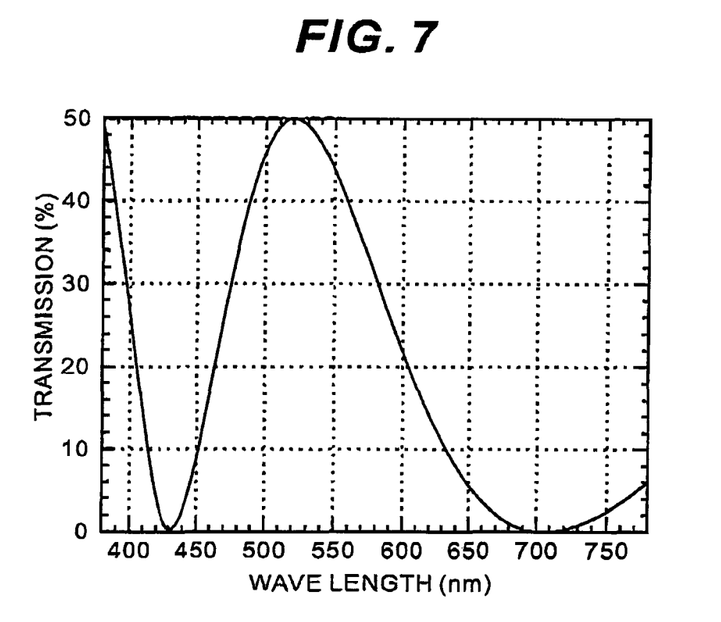
FIG. 7 shows a transmission spectrum at a wavelength region including a visible region of a liquid crystal display element with a cell thickness of 7.2 µm at temperature of 25 degrees Celsius when no voltage is applied.

FIG. 7 shows a transmission spectrum of a liquid crystal display element with the cell thickness of 7.2 μm at temperature of 25 degrees Celsius when no voltage is applied. The minimum value of the transmission rate at wavelength of 630 nm at 80 degrees Celsius shifts to the wavelength of 700 nm and more at 25 degrees Celsius. The retardation of the liquid crystal cell is 1080 nm at this time.

When an environmental temperature changes to an ordinary temperature of 25 degrees Celsius, a transmission rate curve is shifted by increase in the retardation caused by decrease in the temperature, and the transmission rate at the wavelength of 630 nm increases to approximately 10%. The light emitted from the back light will be leaked substantially at non-voltage and non-selection voltage region, and the contrast decreases, and it cannot be considered as the normally black mode display.

Figure 8:
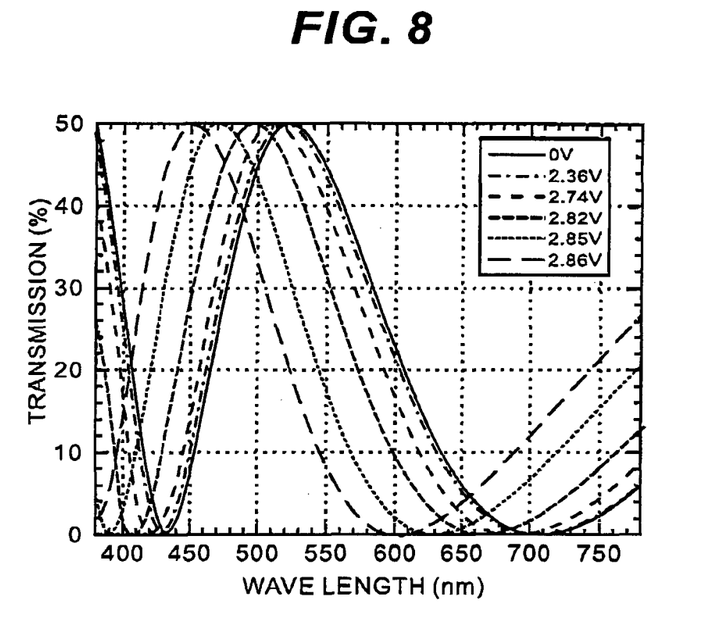
FIG. 8 shows transmission spectra at a wavelength region including a visible region of a liquid crystal display element by using non-selection voltage applied to a liquid crystal cell as a parameter.

FIG. 8 shows transmission spectra by using the applied voltage (actual value) as a parameter. The temperature is 25 degrees Celsius. As shown in the diagram, the transmission spectrum of the applied voltage of 0V remains almost same in the range of the applied voltage of 0V to 2.36V. When the non-selection voltage is set at this range, displays of a background region and non-selection region become approximately equal. When the applied voltage becomes larger than 2.36V, the transmission spectra start to shift to the short wavelength side (left). When the applied voltage is 2.86V, the wavelength of the minimum value of the transmission shifts to near 610 nm. When the applied voltage is decreased in the range of 2.86V to 2.36V, the transmission spectrum shifts to the long wavelength side (right).

When the applied voltage is adjusted in the voltage range of 2.36V to 2.86V, it is considered that the wavelength of the minimum value of the transmission rate can be adjusted in the range of 700 nm to 610 nm (the range from 0 nm to 90 nm as a wavelength decreasing amount).

The transmission spectra are basically in the same configuration in the applied voltage range from 0V to 2.86V, and it is considered that an orientation switch (horizontal to vertical transition) of nematic liquid crystal molecules is not occurred. It is in the usable voltage range as non-selection voltage. The retardation can be adjusted without leading to the liquid crystal orientation switch by increasing or decreasing the non-selection voltage in the range of 2.36V to 2.86V. It is considered that the retardation decreases by increasing the voltage, and the retardation increases by decreasing the voltage.

A temperature dependency of a transmission spectrum can be compensated by using a voltage dependency of a transmission spectrum. As shown in FIG. 7, the wavelength of the minimal transmission rate shifted to the long wavelength side can be shifted to the short wavelength side to match the wavelength of the minimal transmission spectrum with a wavelength of 630 nm by decreasing the retardation of the liquid crystal cell by increasing the non-selection voltage and at the temperature lower than the maximum temperature. When the maximum temperature is defined as a reference state, the temperature when using will be constantly lower than the reference state. If an amount of the retardation increase caused by the temperature decrease from the maximum temperature is compensated with increase in the non-selection voltage, the transmission spectrum can be nearly kept constant.

For example, the non-selection voltage of 2.85V is applied to the liquid crystal cell with the properties shown in FIG. 5 and FIG. 7 at the temperature of 25 degrees Celsius. The wavelength of the minimal value of the transmission rate becomes 630 nm. The wavelength of the minimal value of the transmission rate can be adjusted to 630 nm by adjusting the non-selection voltage applied corresponding to the temperature at other temperature. Moreover, the above-described temperature range and the voltage range are not limited. A function to adjust the voltage corresponding to the temperature may be interlocked with the environmental temperature and the applied voltage by mounting a thermal sensor that can detect the environmental temperature around the device in the controlling device 103 shown in FIG. 1A and FIG. 1B.

The retardation is set so that the wavelength of the minimal value of the transmission rate is adjusted to the light-emitting wavelength at the maximum temperature in this embodiment. The maximum temperature is the reference state. The wavelength of the minimal value of the transmission rate shifts to the long wavelength side by decrease in the temperature at a time of usage; however, the wavelength of the minimal value of the transmission rate is adjusted to the light-emitting wavelength by increasing the non-selection voltage. A comparative example is observed for comparison. In the comparative example, the retardation is adjusted so that the wavelength of the minimal value of the transmission rate shifts to the light-emitting wavelength at room temperature. The room temperature is the reference state. An amount of change in the retardation corresponding to the change in temperature is compensated by adjusting the non-selection voltage.

Figure 9:
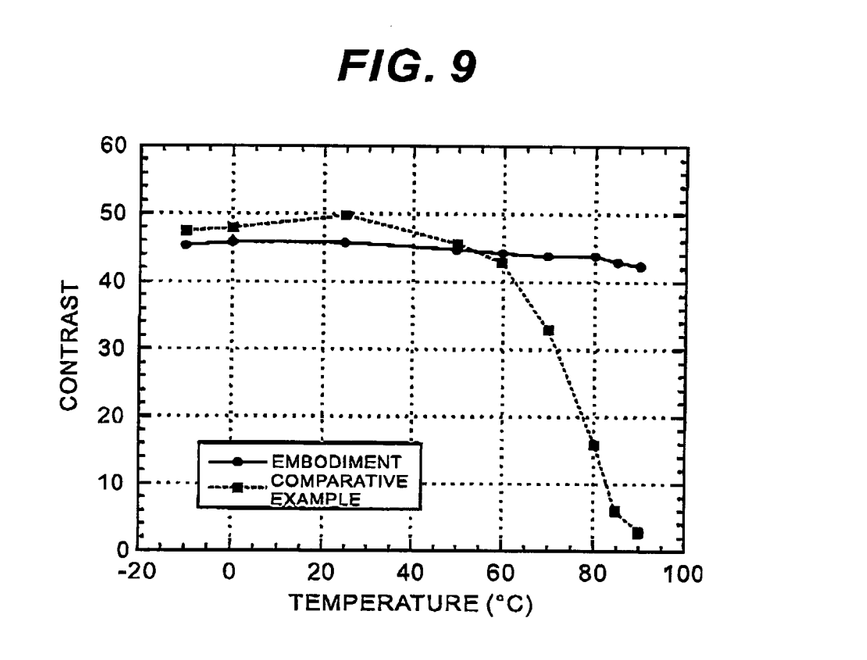
FIG. 9 is a graph showing relationships between contrast and temperatures for the liquid crystal display element according to the embodiment and a liquid crystal display element according to a comparative example.

FIG. 9 shows change of the contrast to the temperature for the liquid crystal display element according to the embodiment and the liquid crystal display element according to the comparative example. In the diagram, the solid line represents the embodiment, and the broken line represents the comparative example. As shown in the diagram, the contrast according to the comparative example is higher than the contrast according to the embodiment at −10 to 50 degrees Celsius; however, the contrast according to the comparative example decreases to the lower value than the contrast according to the embodiment when the temperature becomes over approximately 50 degrees Celsius, and the contrast according to the comparative example remarkably decreases when the temperature becomes over 60 degrees Celsius. The contrast according to the embodiment is slightly low at the low temperature; however, the contrast according to the embodiment is kept almost constant even if the temperature increases, and the contrast decreases by only a few percent.

As described in the above, stability of the display in the temperature change of the STN liquid crystal display device restraining the change in the transmission rate by the temperature change by controlling a voltage of the applied non-selection voltage is good. In addition, when the condition 1 and a+b=90 degrees Celsius are satisfied, high contrast can be realized when viewed from the front.

In the above-described example, the temperature of 20 degrees Celsius lower than the phase transition temperature is assumed as the maximum temperature in the usable temperature range, and the wavelength of the minimum value of the transmission rate was adjusted to the light-emitting wavelength at the maximum temperature. It is not necessary to limit the temperature (reference temperature) at a time of setting the condition to the maximum temperature. However, when the temperature near the ordinary temperature is set to the reference temperature, there is a case that it cannot be handled only by adjusting the applied voltage when using at the higher temperature than the reference temperature. The property of the liquid crystal begins to decrease over the temperature of 60 degrees Celsius, and particularly it is noticeable to decrease over the temperature of 70 degrees Celsius. It is generally assumed that the usable limit temperature at the high temperature is 85 degrees Celsius, and particularly it is assumed that the temperature is 90 degrees Celsius when the high temperature is required. The property of the liquid crystal decreases remarkably at the higher temperature than the 90 degrees Celsius, and it cannot be used as the liquid crystal display device. Therefore, it is desirable that the reference temperature T (degree Celsius) that is the reference state is set to $T_N-40 \leq T \leq T_{NI}-10$ and preferably set to in a range of 70 degrees Celsius to 90 degrees Celsius.

The inventor researched a condition in which a good display could be obtained even if a viewing angle is shifted up, low, right and left. Viewing angle characteristics, particularly the viewing angle characteristics in the right and left directions, are significant for usage such as being used in a car. There is a correlation between the viewing angle characteristics when no voltage is applied and the twist angle of the liquid crystal layer. The twist angle suitable for the STN liquid crystal display device was researched.

Figure 10:
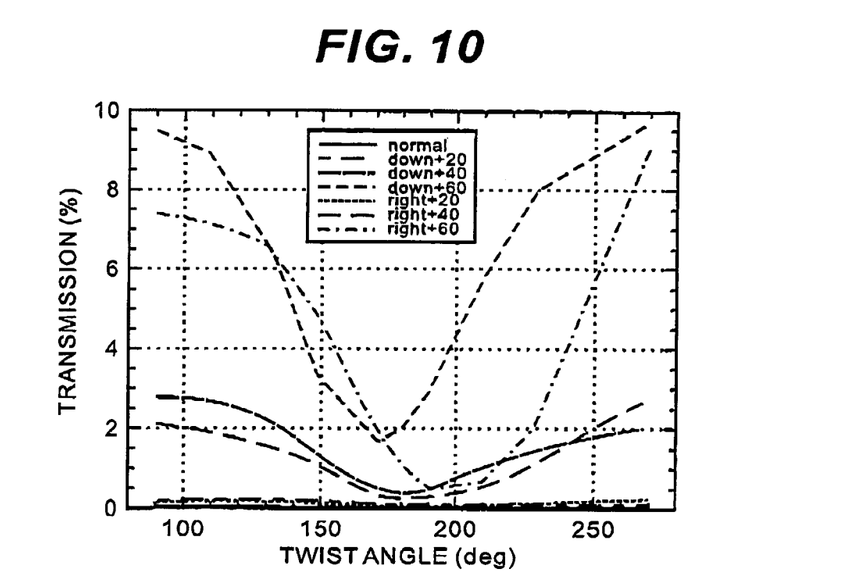
FIG. 10 is a graph showing relationships between transmission rates and twist angles by using viewing angles as a parameter at a wavelength of 630 nm for a STN liquid crystal display.

FIG. 10 is a graph showing relationships between transmission rates and twist angles by using a viewing angle as a parameter at a wavelength of 630 nm for the STN liquid crystal display. The cell condition is the temperature of 25 degrees Celsius and the retardation of 847 nm. In the graph, only directions viewed from a down side and a right side are shown; however, directions viewed from a down side and an up side can be considered as the same, and directions viewed from a right side and a left side can be considered as the same.

In order to realize a display having a wide viewing angle it is preferable to realize a low transmission rate when no voltage is applied inside the viewing angle of 40 degrees both in the up-down and the left-right directions. According to observation of displays under various conditions, it was found that good display could be obtained if the minimum transmission rate is not more than 1% when no voltage was applied inside the viewing angle of 40 degrees. As shown in FIG. 10, the twist angle of the liquid crystal layer is 155 to 210 degrees (condition 2) when the transmission rate is not less than 1% at the viewing angle of 40 degrees in the direction viewed from the down (up) or right (left) side.

More preferable twist angles are described. For a car-mounted display, the viewing angles viewed from the left and right sides (left/right viewing angle) are considered as more important. Therefore, the transmission rate when no voltage inside the left/right viewing angle of 40 degrees is applied is preferably as low as possible. According to observation of displays under various conditions in this aspect, it was found it is more preferable for a car mount display to realize the transmission rate of not more than 0.3% inside the viewing angle of 40 degrees. As shown in FIG. 10, the twist angle of the liquid crystal layer is 170 to 200 degrees when the transmission rate is not less than 0.3% at the viewing angle of 40 degrees in the direction viewed from the right (left) side.

Figure 11A:
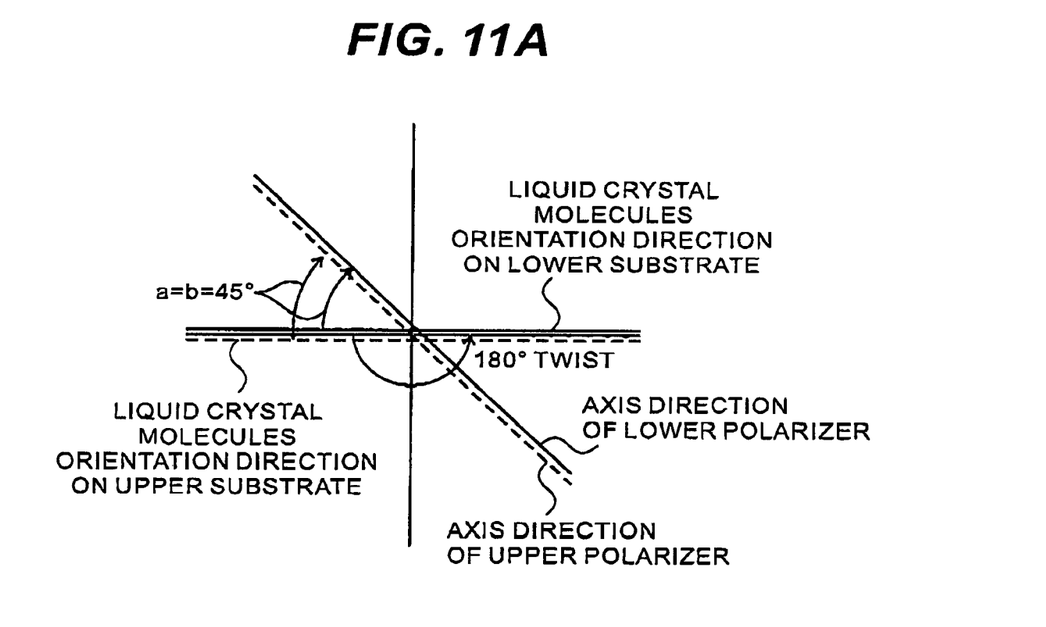
FIG. 11A is a diagram showing in-plane directions of the STN liquid crystal display.

FIG. 11A is a diagram showing in-plane arrangements of the liquid crystal molecules orientation directions and the polarizer axis directions of the STN liquid crystal display satisfying the conditions 1 and 2. As shown in the diagram, the twist angle of the liquid crystal is 180 degrees. The smaller angle (angle a) is 45 degrees in angles between the orientation direction of the liquid crystal molecules adjacent to the upper substrate and the axis direction of the upper polarizer, and the smaller angle (angle b) is also 45 degrees in angles between the orientation direction of the liquid crystal molecules adjacent to the lower substrate and the axis direction of the lower polarizer. The cell condition of the liquid crystal cell is temperature of 25 degrees Celsius and the retardation of 713 nm.

Figure 11B:
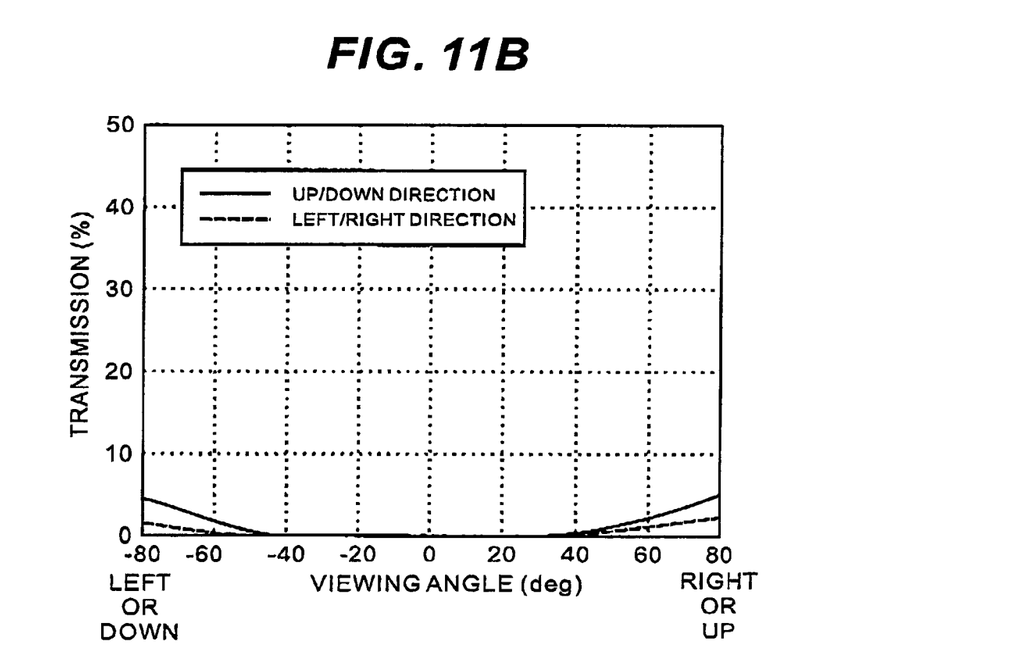
FIG. 11B is a graph showing relationships between transmission rates and viewing angles at a wavelength of 630 nm for the STN liquid crystal display.

FIG. 11B is a graph showing relationships between the transmission rates and the viewing angles at a wavelength of 630 nm for the STN liquid crystal display when no voltage is applied. As shown in the graph, the transmission rates are kept 1% or under inside the viewing angle of 40 degrees both in the up/down directions and the left/right directions. Moreover, as for the left/right directions, the transmission rates are kept 1% or under inside the viewing angle of 60 degrees. Therefore, it can say that the STN liquid crystal display has good viewing angle characteristics.

Figure 12:
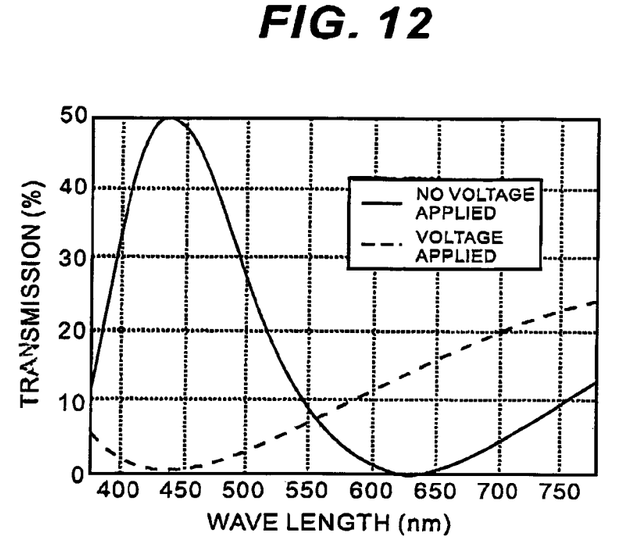
FIG. 12 shows transmission spectra at a wavelength region including a visible region of the STN liquid crystal display when no voltage is applied and when the (ON) voltage is applied.

FIG. 12 shows transmission spectra at a wavelength region including a visible region of the STN liquid crystal display when no voltage is applied and when the (ON) voltage is applied. In the diagram, the transmission rate at a wavelength of 630 nm when no voltage is applied is approximately 0% and so high contrast can be realized. On the other hand, the transmission rate when the voltage is applied is about 14% that can be considered as low. If the transmission rate when the voltage is applied is increased, the property of a liquid crystal display can be better. The inventor examined a condition (condition 3) which can further improve the transmission rate when the ON voltage is applied.

Figure 13:
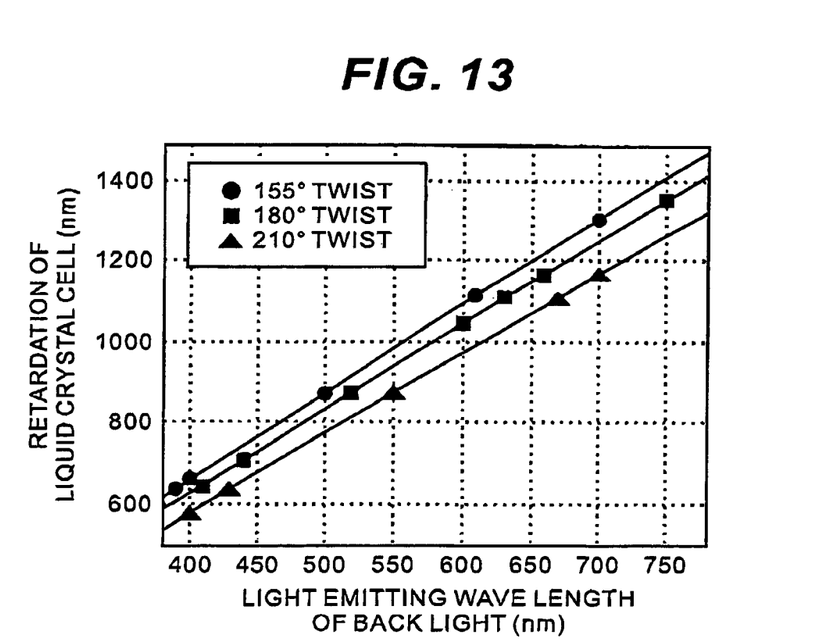
FIG. 13 is a graph showing relationships between optimal retardation and a light emitting peak wavelength.

FIG. 13 is a graph showing a range of optimal retardation for a light emitting peak wavelength. In the graph, optimal retardations which can obtain high transmission rate when the ON voltage is applied with the twist angles of 155, 180 and 210 degrees are plotted and connected by straight lines. The line with circle plotted points represents the optimal retardation with the twist angle of 155 degrees, the line with square plotted points represents the optimal retardation with the twist angle of 180 degrees, and the line with triangle plotted points represents the optimal retardation with the twist angle of 210 degrees. In this specification, the optimal retardation refers to retardation which can heighten the transmission rate when the ON voltage is applied without obstructing operations of the liquid cell to the utmost according to the inventor's consideration. At the same wavelength the optimal retardation with the twist angle of 155 degrees is the highest, and the optimal retardation with the twist angle of 210 degrees is the lowest. The optimal retardation with the twist angle of 180 degrees is positioned between the optimal retardations with the twist angles of 155 and 210 degrees. Moreover, the optimal retardations within a range of the twist angles of 155 to 210 degrees are positioned between the optimal retardations with the twist angles of 155 and 210 degrees.

From the above-described result, a range of the retardation R which can be the condition 3 can be represented by the following EQUATION 1.

$$1.95\lambda - 200 \leq R \leq 2.13\lambda - 185 \qquad \text{EQUATION 1,}$$

where a peak wavelength of light emitted by a monochromatic light source is $\lambda$. This is a necessary condition for obtaining the high transmission rate near the peak wavelength of light emitted by a monochromatic light source when the ON voltage is applied. Further, the retardation of the liquid crystal display shown in FIG. 11A is represent by $\lambda$ mark in the graph.

The inventor tried to introduce a generalized equation for the EQUATION 1 ($1.95\lambda - 200 \leq R \leq 2.13\lambda - 185$). Let a function of the retardation represented by a function of a wavelength $\lambda$ be approximated with the following EQUATION 2 by using linear functions of the twisted angle T (degree): $f(T)=aT+b$; and $g(T)=cT+d$.

$$R = f(T)\lambda + g(T) \qquad \text{EQUATION 2}$$

The EQUATION 1 is applied to each of the following EQUATION 3 and EQUATION 4, which are equations of the retardations with the twist angles of 155 and 210 degrees.

$$R = 2.13\lambda - 185 \qquad \text{EQUATION 3}$$

$$R = 1.95\lambda - 200 \qquad \text{EQUATION 4}$$

Simultaneous equations (EQUATIONS 5-1 to 6-2) as follows can be obtained by applying the EQUATION 1 to each of the EQUATIONS 3 and 4.

$$f(155) = 155a + b = 2.13 \qquad \text{EQUATION 5-1}$$

$$f(210) = 210a + b = 1.95 \qquad \text{EQUATION 5-2}$$

$$g(155) = 155c + d = -185 \qquad \text{EQUATION 6-1}$$

$$g(210) = 210c + d = -200 \qquad \text{EQUATION 6-2}$$

By solving the simultaneous equations (EQUATIONS 5-1 to 6-2), the following EQUATION 7 can be obtained.

$$R = (-0.00327T + 2.637)\lambda - 0.2727T - 142.7$$
$$(155 \leq T \leq 210) \qquad \text{EQUATION 7}$$

The EQUATION 7 is an equation representing an optimal value of the retardation, and it can be considered as the condition 3 desired for heightening the transmission rate when the ON voltage is applied if the retardation is within ±10% of the optimal value.

As described in the above, the liquid crystal display equipped with applying voltage controlling means for taking measures to temperature has good stability of the transmission rate toward change in temperature and can keep quality of display regardless of change in temperature. Moreover, with satisfying the conditions 1 to 3, the liquid crystal display has high light blocking property when no voltage is applied, high contrast and good viewing angle characteristics.

As a result of examinations of various combinations of the angles a and b to make the angle a+b 90 degrees, it was found that the transmission rate when the ON voltage is applied records the highest in case of a combination wherein both angles a and b are 45 degrees (a=b=45 degrees).

The inventor made a liquid crystal display with the above-described measures for temperature, satisfying the conditions 1 to 3. The liquid crystal display has the twist angle of 180 degrees, the retardation of 1110 nm (at temperature of 25 degrees Celsius) and a back light having a light emitting wavelength of 630 nm, wherein the angle a was set to 45 degrees and the angle b was set to 45 degrees. When the liquid crystal display was driven, display quality (contrast, viewing angle characteristics and thermal property) was very good.

In actual products, it is difficult to make the angles a and b 45 degrees exactly because of manufacturing errors. High contrast can be obtained when both angles a and b are 45±3.5 degrees.

Figure 14:
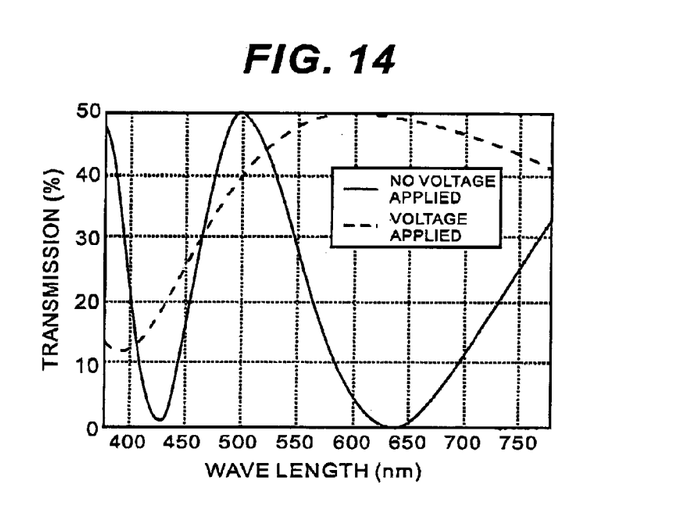
FIG. 14 shows transmission spectra at a wavelength region including a visible region of the liquid crystal display according to the embodiment of the present invention when no voltage is applied and when the (ON) voltage is applied.

FIG. 14 shows transmission spectra at a wavelength region including a visible region of the liquid crystal display according to the embodiment of the present invention when no voltage is applied and when the (ON) voltage is applied. It can be recognized that the transmission spectrum at the wavelength of 630 nm when the (ON) voltage is applied is significantly improved as compared to the transmission spectrum shown in FIG. 12.

Further, in the liquid crystal display having the property shown in FIG. 12, a ratio of transmission rate when the voltage is applied to the transmission rate when no voltage is applied is large at the wavelength near 450 nm, and excellent display quality can be obtained although on a positive type display. A blue light source with a peak light emission wavelength near 450 nm can be used as a back light for this liquid crystal display. In this case, a liquid crystal display with high contrast on a negative mode display can be realized by rotating either one of upper and lower polarizers at 90 degrees.

Furthermore, the retardation calculated by the above-described equation 7 with the wavelength of 450 nm can be used for optimizing the matching with the back light wavelength. As a result of calculation by using the equation 7, the retardation R at the wavelength of 450 nm when the twist angle is 155 degrees is 774 nm, it is 730 nm when the twist angle is 180 degrees, and it is 678 nm when the twist angle is 210 degrees.

The method for restraining change in the retardation by adjusting the applied voltages (the non-selection voltage) to the liquid crystal layer when no voltage is applied is very effective in a part where opposing electrodes are overlapping with each other. The non-selection voltage is not applied to a region where only one of the opposing electrodes exists and a region where no electrode exists, that is, the non-selection voltage is not applied to a background region excluded from a display region. The change in the retardation by change in temperature turns up as the change in the transmission spectrum. Light leakage is occurred in a region where black must be displayed. There happens a difference in the transmission rates between the background part and a display pattern where the non-selection voltage is applied (e.g., an OFF segment).

Figure 15:
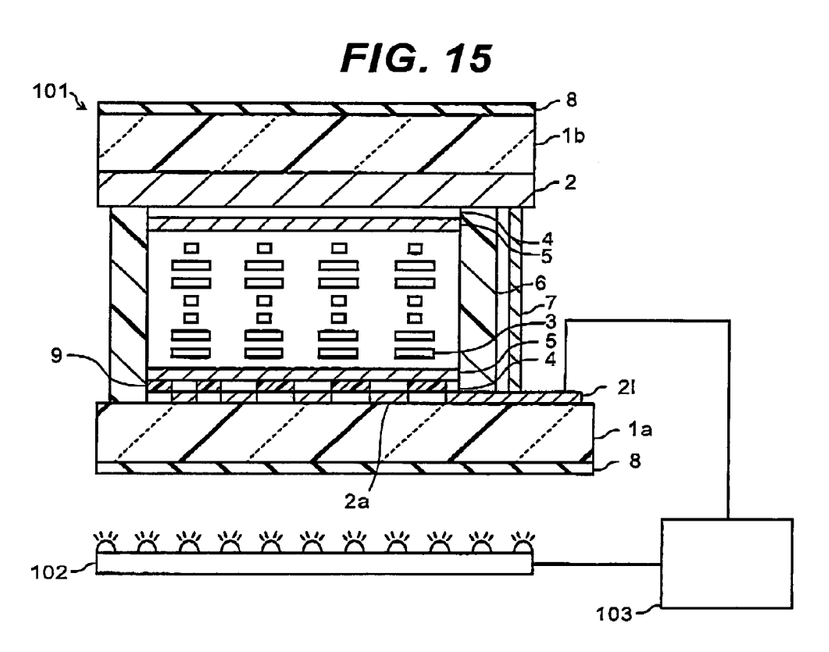
FIG. 15 is a cross sectional view showing a liquid crystal display having a black mask.

FIG. 14 is a cross sectional view showing the liquid crystal display having a black mask. A black mask 9 is arranged in a background part to avoid light leakage. A good black display is possible both in an OFF segment and the background. The position of the black mask 9 is not limited to the position shown in the drawing as far as the black mask 9 covers the background region in the plane. For example, the black mask 9 can position between the substrate 1a and the electrode 2a.

The present invention has been described in connection with the preferred embodiments. The invention is not limited only to the above embodiments. For example, a laser may be used as the monochromatic light source besides an LED. A wavelength of the minimum transmission rate and a light emitting wavelength may not completely agree with each other in an actual product. It can be considered as a permissible range if the wavelengths are different by about 15 nm. Moreover, display with a good thermal property can be obtained by a TN type liquid crystal display or an STN type liquid crystal display without the twist angle of 150 to 210 degrees if they have a liquid crystal layer with birefringence and can maintain the fixed retardation by adjusting the non-selection voltage in accordance with change in temperature. It is apparent that various modifications, improvements, combinations, and the like can be made by those skilled in the art.

What are claimed are:

1. A liquid crystal display, comprising:
a back light emitting monochromatic light;
a liquid crystal display element comprising a pair of opposing substrates, a nematic liquid crystal layer placed between the pair of opposing substrates, an electrode pattern formed on a nematic liquid crystal layer side of each substrate, and a pair of polarizers placed outside the pair of substrates; and
a controller which controls light emission of the back light and a voltage applied to the liquid crystal display element,
wherein the controller controls to restrain change in retardation of the liquid crystal display element by lowering a non-selection voltage applied to the liquid crystal display element when an environmental temperature increases and by increasing the non-selection voltage applied to the liquid crystal display element when the environmental temperature decreases; and
wherein retardation of the liquid crystal display element is set to match a wavelength at which a minimum transmission rate of the liquid crystal display element when no voltage is applied with a light emitting peak wavelength of the back light in a reference state in which an environmental temperature is 10 to 40 degrees Celsius lower than liquid crystal phase-isotropic phase transition temperature.

2. The liquid crystal display according to claim 1, wherein the controller matches the wavelength of the minimum transmission rate of the liquid crystal display element when no voltage is applied with the light emitting peak wavelength of the back light by adjusting the non-selection voltage applied to the liquid crystal display element at a temperature which is not a temperature of the reference state in which the minimum transmission rate of the liquid crystal display element when no voltage is applied is matched with the light emitting peak wavelength of the back light.

3. The liquid crystal display according to claim 1, wherein a temperature of the reference state is 70 to 90 degrees Celsius.

4. The liquid crystal display according to claim 1, wherein the liquid crystal display element is a twisted nematic type.

5. The liquid crystal display according to claim 1, wherein the liquid crystal display element is a super twisted nematic type.

6. The liquid crystal display according to claim 5, wherein a sum of smaller angles between an orientation direction of liquid crystal molecules in the nematic liquid crystal layer adjacent to the pair of the substrates and axis directions of the polarizers is 90±7 degrees.

7. The liquid crystal display according to claim 6, wherein
a twist angle of the nematic liquid crystal layer is 155 to 210 degrees, and
the retardation R of the liquid crystal display element is in a range of ±10% of an equation $$R=(-0.00327T+2.637)\lambda-0.2727T-142.7 (155 \leq T \leq 210),$$

where λ(nm) is a light emitting peak wavelength of the back light, and T(degrees) is the twist angle of the nematic liquid crystal layer.

8. The liquid crystal display according to claim 7, wherein the twist angle of the nematic liquid crystal layer is 170 to 200 degrees.

9. The liquid crystal display according to claim 6, wherein both smaller angles between the orientation direction of liquid crystal molecules in the nematic liquid crystal layer adjacent to the pair of the substrates and axis directions of the polarizers are 45±3.5 degrees.

10. The liquid crystal display according to claim 1, wherein the liquid crystal display element further comprises a black mask arranged in an in-plane region where the electrode patterns do not oppose to each other.

* * * * *